(12) United States Patent
Marupaduga et al.

(10) Patent No.: US 9,986,553 B1
(45) Date of Patent: May 29, 2018

(54) WIRELESS SIGNALING BETWEEN WIRELESS E-NODE-B BASE STATIONS OVER DEVICE-TO-DEVICE (D2D) USER EQUIPMENT (UE) GROUPS

(71) Applicant: Sprint Communications Company L.P., Overland Park, KS (US)

(72) Inventors: Sreekar Marupaduga, Overland Park, KS (US); Clark Douglas Halferty, Lee's Summit, MO (US); Kelley W. Ireland, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 72 days.

(21) Appl. No.: 15/277,759

(22) Filed: Sep. 27, 2016

(51) Int. Cl.
*H04W 92/20* (2009.01)
*H04W 72/04* (2009.01)
*H04W 16/32* (2009.01)
*H04W 88/04* (2009.01)
*H04W 84/04* (2009.01)

(52) U.S. Cl.
CPC ....... *H04W 72/0426* (2013.01); *H04W 16/32* (2013.01); *H04W 84/042* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 8,615,241 B2 | 12/2013 | Gupta et al. |
| 8,897,830 B2 | 11/2014 | Gao |
| 9,019,841 B2 | 4/2015 | Tavildar et al. |
| 9,049,668 B2 | 6/2015 | Tavildar et al. |
| 9,264,971 B2 | 2/2016 | Wilkinson et al. |
| 9,326,122 B2 | 4/2016 | Xiong et al. |
| 9,398,515 B2 | 7/2016 | Wilkinson et al. |
| 2015/0016358 A1 | 1/2015 | Yie et al. |
| 2015/0109955 A1 | 4/2015 | Wilkinson et al. |
| 2015/0296390 A1 | 10/2015 | Mino Diaz et al. |

FOREIGN PATENT DOCUMENTS

| | | |
|---|---|---|
| CN | 101772052 | 7/2010 |
| CN | 103491645 | 1/2014 |
| WO | 2014205735 | 12/2014 |

*Primary Examiner* — Phuongchau Ba Nguyen

(57) ABSTRACT

In a wireless communication network, a pair of eNodeBs exchange X2 signaling over a primary X2 signaling link. The eNodeBs implement a secondary X2 signaling link when the primary X2 signaling link goes down. The eNodeBs serve multiple wireless communication device groups with a Device-to-Device (D2D) communication service. The eNodeBs detect a performance loss of the primary X2 link, and the eNodeB with the most device groups selects a group to implement the secondary X2 link. The eNodeBs establish the secondary X2 signaling link through the selected device group. The eNodeBs exchange X2 signaling over the secondary X2 signaling link through the selected wireless communication device group. The selected device group uses the D2D communication service to exchange the X2 signaling over the secondary X2 signaling link.

20 Claims, 5 Drawing Sheets

WIRELESS SIGNALING BETWEEN WIRELESS E-NODE-B BASE STATIONS OVER DEVICE-TO-DEVICE (D2D) USER EQUIPMENT (UE) GROUPS

TECHNICAL BACKGROUND

Data communication systems exchange user data for user devices to provide various data communication services. The user devices may be phones, computers, media players, intelligent machines, and the like. The data communication services might be media streaming, video conferencing, machine-to-machine data transfers, internet access, or some other data communication service.

Data communication systems uses wireless access points to extend the range of their communication services and enable user service mobility. The wireless access points perform wireless networking tasks like device handovers, radio interference management, and multipoint coordination. To facilitate these wireless networking tasks, the wireless access points communicate over signaling links. In Long Term Evolution (LTE) networks, the wireless access points are evolved Node Bs (eNodeBs), and the signaling links between the eNodeBs are X2 signaling links.

LTE eNodeBs also offer a Device-to-Device (D2D) communication service. The D2D communication service enables User Equipment (UE) to perform direct wireless transmission/reception without user data traversal through the eNodeB. For the D2D service, the eNodeB schedules one UE to transmit over an LTE resource block, and the eNodeB also schedules other UEs to receive over that same LTE resource block. Thus, a UE transmits directly to other UEs over the same resource blocks. The eNodeB controls and schedules D2D communications between the UEs, but the eNodeB does not relay user data between the UEs for the D2D communication service.

LTE eNodeBs are available in varying form-factors and with differing networking capabilities. Large macrocell eNodeBs are coupled to LTE network cores and serve both UEs and smaller access points like picocell eNodeBs. In turn, the picocell eNodeBs serve both UEs and even smaller femtocell eNodeBs. The femtocell eNodeBs serve UEs and perhaps even tiny nanocell eNodeBs. Unfortunately, current wireless communication networks do not effectively integrate X2 and D2D systems. In particular, UE D2D communications in LTE networks do not effectively support X2 signaling in the femtocell/picocell wireless networking environment.

TECHNICAL OVERVIEW

In a wireless communication network, a pair of eNodeBs exchange X2 signaling over a primary X2 signaling link. The eNodeBs implement a secondary X2 signaling link when the primary X2 signaling link goes down. The eNodeBs serve multiple wireless communication device groups with a Device-to-Device (D2D) communication service. The eNodeBs detect a performance loss of the primary X2 link, and the eNodeB with the most device groups selects a group to implement the secondary X2 link. The eNodeBs establish the secondary X2 signaling link through the selected device group. The eNodeBs exchange X2 signaling over the secondary X2 signaling link through the selected wireless communication device group. The selected device group uses the D2D communication service to exchange the X2 signaling over the secondary X2 signaling link.

DETAILED DESCRIPTION

Figure 1:
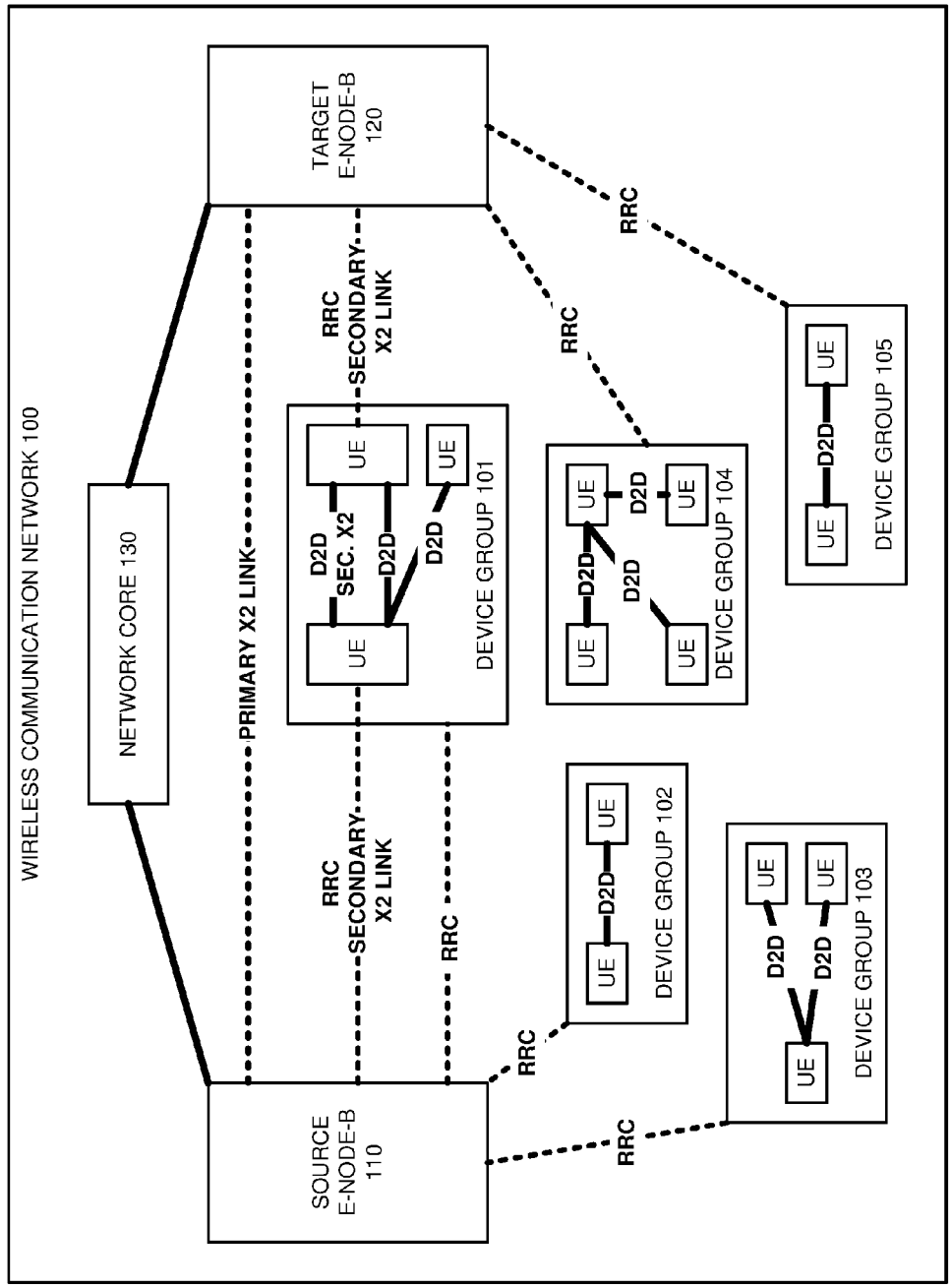
FIGS. 1-3 illustrate a wireless communication network to implement secondary X2 signaling links over wireless communication device groups using Device-to-Device (D2D) links.
Figure 2:
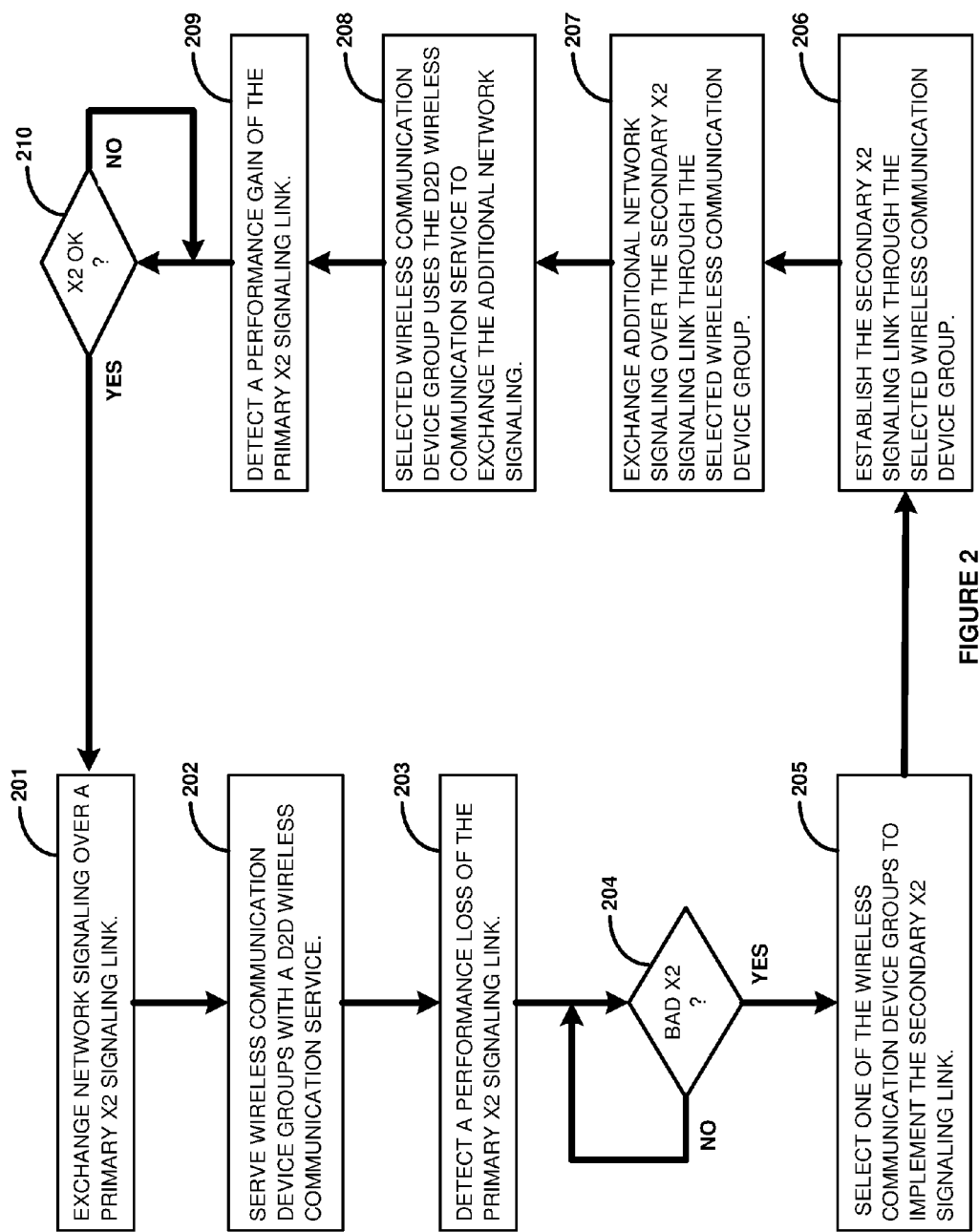
Figure 3:
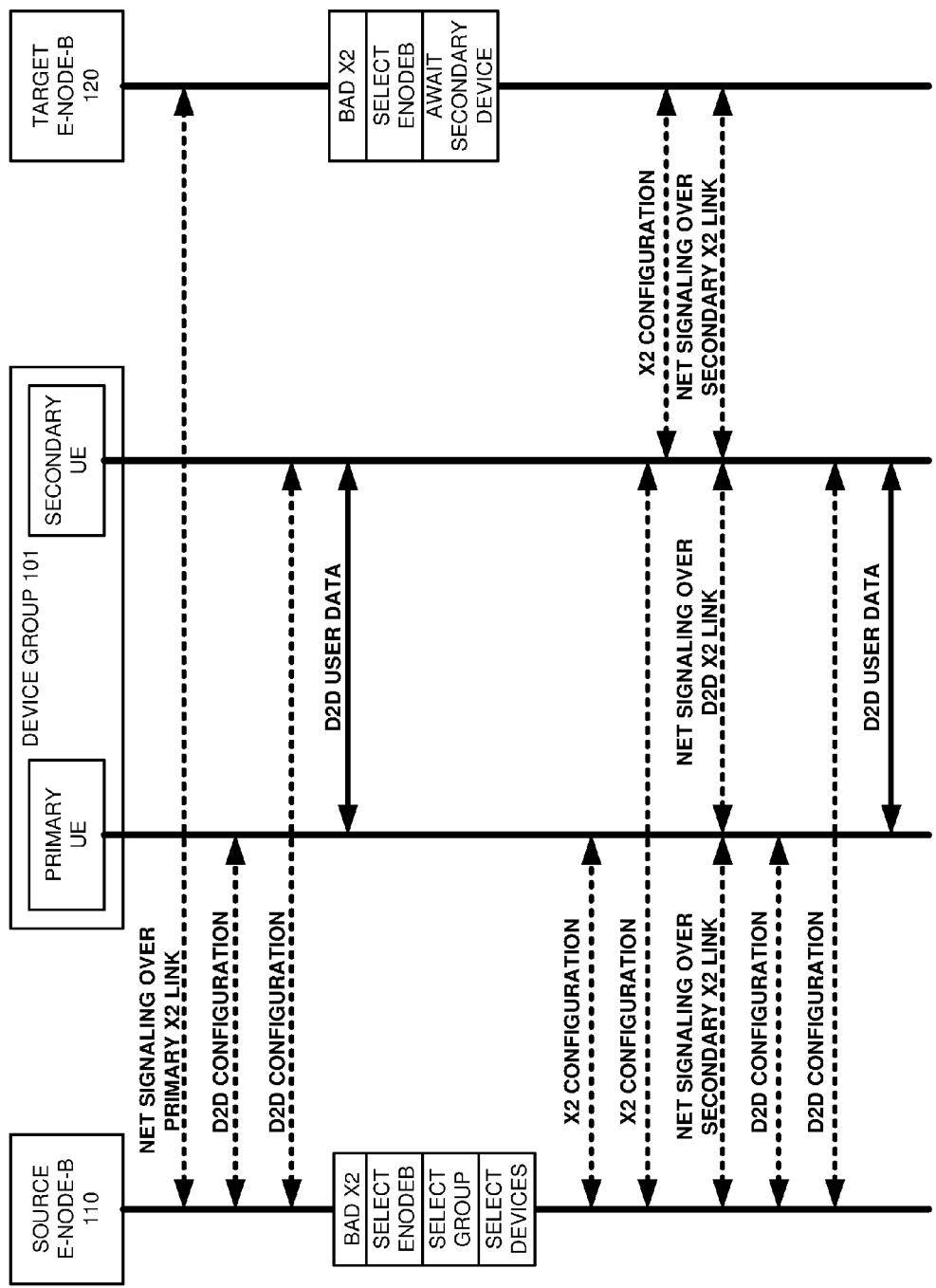

FIGS. 1-3 illustrate wireless communication network 100 to implement secondary X2 signaling links over wireless communication device groups 101-105 using a Device-to-Device (D2D) links. Referring to FIG. 1, wireless communication network 100 exchanges user data for User Equipment (UE). The data exchanges support data services such as content streaming, media conferencing, machine communications, internet access, or some other computerized information service. Wireless communication network 100 comprises wireless communication device groups 101-105, eNodeBs 110 and 120, and network core 130.

Wireless communication device groups 101-105 each comprise UEs that could be computers, phones, or some other intelligent machines. The UEs have wireless communication transceivers comprising antennas, amplifiers, modulators, filters, and digital signal processors. The UEs also have data processing circuitry, memory, operating software to control the transceivers and serve user/machine applications. In wireless communication device groups 101-105, the UEs use wireless Radio Resource Control (RRC) signaling to attach, request services, and exchange data with eNodeBs 110 and 120. The UEs use RRC signaling for secondary X2 signaling links. The UEs are also configured to implement D2D communications under control of eNodeBs 110 and 120. The UEs also use D2D communications for the secondary X2 signaling links.

Source eNodeB 110 and target eNodeB 120 could be picocell base stations, femtocell base stations, or some other wireless access point. eNodeBs 110 and 120 each have wireless communication transceivers comprising antennas, amplifiers, modulators, filters, and digital signal processors. eNodeBs 110 and 120 also have data processing circuitry, memory, operating software to control the transceivers and serve network applications. The network applications include UE attachment, service scheduling, and user data transfer. eNodeBs 110 and 120 use RRC signaling to perform UE attachment, schedule services, and exchange data with the UEs. eNodeBs 110 and 120 are also configured to implement D2D communications by scheduling direct wireless transfers between UEs in the same wireless communication device group. eNodeBs 110 and 120 also schedule D2D communications for the secondary X2 signaling links. eNodeBs 110 and 120 also use RRC signaling for the secondary X2 signaling links.

In operation, eNodeBs 110 and 120 exchange network signaling over a primary X2 signaling link. The network signaling comprises interference information, handover information, coordinated multi-point data, D2D information, and the like. Source eNodeB 110 serves wireless communication device groups 101-103 with a D2D wireless communication service. To facilitate the D2D service, Source eNodeB 110 exchanges D2D access and scheduling data over Radio Resource Control (RRC) links with the UEs in D2D groups 101-103.

Target eNodeB 120 serves wireless communication device groups 104-105 with the D2D wireless communication service. Target eNodeB 120 exchanges D2D access and scheduling data over RRC links with the UEs in wireless communication device groups 104-105. The UEs within wireless communication device groups 101-105 implement the D2D communication service by direct wireless data transfer. One UE in the group is scheduled to transmit, and the other UEs in the group are scheduled to receive that same transmission. The role of transmitting UE is shared among the UEs in the wireless communication device group.

When the primary X2 signaling link falters due to poor performance, eNodeBs 110 and 120 detect the performance loss on the primary X2 signaling link. In response, either eNodeB 110 or eNodeB 120 selects a D2D communication group to implement a secondary X2 signaling link. The eNodeB that performs the D2D group selection is typically the eNodeB with the active most D2D groups, although another metric that is available to both eNodeBs 110 and 120 before the primary X2 signaling link goes down could be used. In this example, eNodeB 110 has three D2D groups, and eNodeB has two D2D groups, so eNodeB 110 is the source eNodeB that will select the wireless communication device communication group for the secondary X2, because eNodeB 110 has more groups than eNodeB 120.

Source eNodeB 110 maintains location information for the UEs in its wireless communication device groups 101-103. Source eNodeB 110 selects one of its wireless communication device groups 101-103 for the secondary X2 signaling link. Source eNodeB 110 typically selects the group that is closest to target eNodeB 120—or the group having the closest UE to target eNodeB 120. Thus, source eNodeB 110 selects a wireless communication device group that is co-located in the coverage areas of both eNodeBs 110 and 120. Other metrics could be considered for group selection like signal strength, UE capabilities, or some other factor. In this example, source eNodeB 110 selects wireless communication device group 101 because it has the closest UE to target eNodeB 120.

Source eNodeB 110 then selects a primary UE in selected wireless communication device group 101. For the primary UE, source eNodeB 110 selects a UE in group 101 that is closest to source eNodeB 110, although metrics could be considered like signal strength, UE capabilities, or some other factor. Source eNodeB 110 then configures the primary UE in group 101 to exchange network signaling over RRC with source eNodeB 110.

Source eNodeB 110 configures the primary UE in group 101 to exchange the network signaling over D2D with a secondary UE. The secondary UE is typically the closest UE to target eNodeB 120 and the same UE that caused source eNodeB to select group 101 for the secondary X2 signaling link. Source eNodeB 110 configures the secondary UE in group 101 to exchange the network signaling over D2D with the primary UE in wireless communication device group 101.

Source eNodeB 110 also configures the secondary UE in wireless communication device group 101 to initiate an RRC connection with target eNodeB 110 for the secondary X2 signaling link. Typically, target eNodeB 110 is awaiting an RRC contact from a secondary UE for the secondary X2 signaling link after detecting loss of the primary X2 link but determining that source eNodeB 101 would initiate the secondary X2 signaling link.

Source eNodeB 110 and target eNodeB 120 then exchange additional network signaling over the secondary X2 signaling link that traverses selected wireless communication device group 101. Source eNodeB 110 and the primary UE exchange the additional network signaling over RRC. Target eNodeB 110 and the secondary UE also exchange the additional network signaling over RRC. The primary UE and the secondary UE in selected wireless communication device group 101 exchange the additional network signaling over D2D.

Thus, source eNodeB 110 schedules and exchanges network signaling for the secondary X2 signaling link over RRC between itself and the primary UE in wireless communication device group 101. Source eNodeB 110 schedules and exchanges the network signaling for the secondary X2 signaling link over D2D between the primary UE and the secondary UE in wireless communication device group 101. Target eNodeB 120 schedules and exchanges the network signaling for the secondary X2 signaling link over RRC between itself and the secondary UE in wireless communication device group 101. Selected device group 101 may still perform D2D transfers in the normal manner under the control of source eNodeB 110. The secondary X2 signaling link is usually dropped when the performance of the primary X2 signaling link returns to an acceptable level.

Referring to FIG. 2, eNodeB operations are described. The eNodeBs exchange network signaling over a primary X2 signaling link (201). The eNodeBs also serve wireless communication device groups with a D2D wireless communication service (202). The eNodeBs monitor their primary X2 signaling link to detect performance problems like loss-of-signal, incoherent data, and the like (203). Various performance thresholds like data timers, parsers, and validators may be used to check the arrival and legitimacy of the X2 signaling.

When the primary X2 signaling link goes bad (204), the eNodeBs select a wireless communication device group to implement a secondary X2 signaling link (205). Typically, the eNodeB that performs the group selection is the eNodeB with the most wireless communication device groups when the primary X2 signaling link goes down. The eNodeB that initiates the secondary X2 signaling link is referred to as the source eNodeB, and the eNodeB that receives the secondary X2 signaling link is referred to as the target eNodeB.

To make the wireless communication device group selection for the secondary X2 signaling link, the source eNodeB maintains location information for its UEs and neighbor eNodeBs. The source eNodeB may select the wireless communication device group having the closest UE to the target eNodeB. The source eNodeB initiates the secondary X2 signaling link through the selected wireless communication device group (206). The source eNodeB selects a primary UE in the selected wireless communication device group. For the primary UE, the source eNodeB may select the UE in the group that is closest to the source eNodeB. The secondary UE is typically the UE in the selected wireless communication device group that is closest to the target eNodeB. The source eNodeB configures the primary UE and the secondary UE in the selected wireless communication device group to support the secondary X2 signaling link over RRC and D2D connections.

The source eNodeB and the target eNodeB then exchange additional network signaling over the secondary X2 signaling link with the selected wireless communication device group (207). The UEs in the selected wireless communication device group use the D2D communication service to exchange the additional network signaling over the secondary X2 signaling link between the eNodeBs (208). The eNodeBs continue monitor their primary X2 signaling link to detect performance gains like return-of-signal, coherent data, and the like (209). When the performance of the primary X2 signaling link returns to an adequate level (210), the eNodeBs again exchange their network signaling over the primary X2 signaling link (201).

Referring to FIG. 3, wireless communication network operations are described. Source eNodeB 110 and target eNodeB 120 exchange network signaling over a primary X2 signaling link. The network signaling comprise interference information, handover information, coordinated multi-point data, D2D information, and the like. Source eNodeB 110 serves wireless communication device group 101 with a D2D wireless communication service. To facilitate the D2D service, Source eNodeB 110 exchanges D2D access and scheduling data over the UEs in device group 101. The UEs in device group 101 directly exchange their user data over D2D links.

Both eNodeB 110 and eNodeB 120 detect the performance loss on their primary X2 signaling link. In response, eNodeBs 110 and 120 select the one of themselves with the most D2D groups, UEs, or resources to initiate the secondary X2 signaling link. In this example, eNodeB 110 is selected as the source eNodeB. Target eNodeB 120 awaits a UE contact for the secondary X2 signaling link.

Source eNodeB 110 selects one of its wireless communication device groups for the secondary X2 signaling link. Source eNodeB 110 typically selects the device group that is close to target eNodeB 120 and that also has an adequate wireless signal back to source eNodeB 110. Thus, source eNodeB 110 selects a wireless communication device group that is co-located in the coverage areas of both eNodeBs 110 and 120.

Source eNodeB 110 then selects a primary UE in selected wireless communication device group 101. For the primary UE, source eNodeB 110 selects a UE in group 101 that is closest to source eNodeB 110, although metrics could be considered like signal strength, UE capabilities, or some other factor.

Source eNodeB 110 configures the primary UE in group 101 to exchange network signaling with source eNodeB 110 over RRC. Source eNodeB 110 configures the primary UE in group 101 to exchange the network signaling with a secondary UE over D2D. The secondary UE is typically the closest UE to target eNodeB 120 and the same UE that caused source eNodeB to select group 101 for the secondary X2 signaling link. Source eNodeB 110 configures the secondary UE in group 101 to exchange the network signaling with the primary UE over D2D.

Source eNodeB 110 also configures the secondary UE in wireless communication device group 101 to initiate an RRC connection with target eNodeB 110 for the secondary X2 signaling link. The secondary UE in selected device group 101 exchanges configuration data for the secondary X2 signaling link with target eNodeB 120.

Source eNodeB 110 and target eNodeB 120 then exchange network signaling over the secondary X2 signaling link that traverses selected wireless communication device group 101. Source eNodeB 110 and the primary UE exchange the network signaling over RRC. Target eNodeB 110 and the secondary UE also exchange the network signaling over RRC. The primary UE and the secondary UE in selected wireless communication device group 101 exchange the additional network signaling over D2D.

Thus, source eNodeB 110 schedules and exchanges network signaling for the secondary X2 signaling link over RRC between itself and the primary UE in wireless communication device group 101. Source eNodeB 110 schedules and exchanges the network signaling for the secondary X2 signaling link over D2D between the primary UE and the secondary UE in wireless communication device group 101. Target eNodeB 120 schedules and exchanges the network signaling for the secondary X2 signaling link over RRC between itself and the secondary UE in wireless communication device group 101.

To maintain the D2D service, source eNodeB 110 exchanges D2D configuration data with the UEs in device group 101. The UEs in device group 101 directly exchange their user data over a D2D link contemporaneously with their transfer of network signaling over another D2D link that supports the secondary X2 signaling link. The secondary X2 signaling link is dropped when the performance of the primary X2 signaling link returns to an acceptable level.

Figure 4:
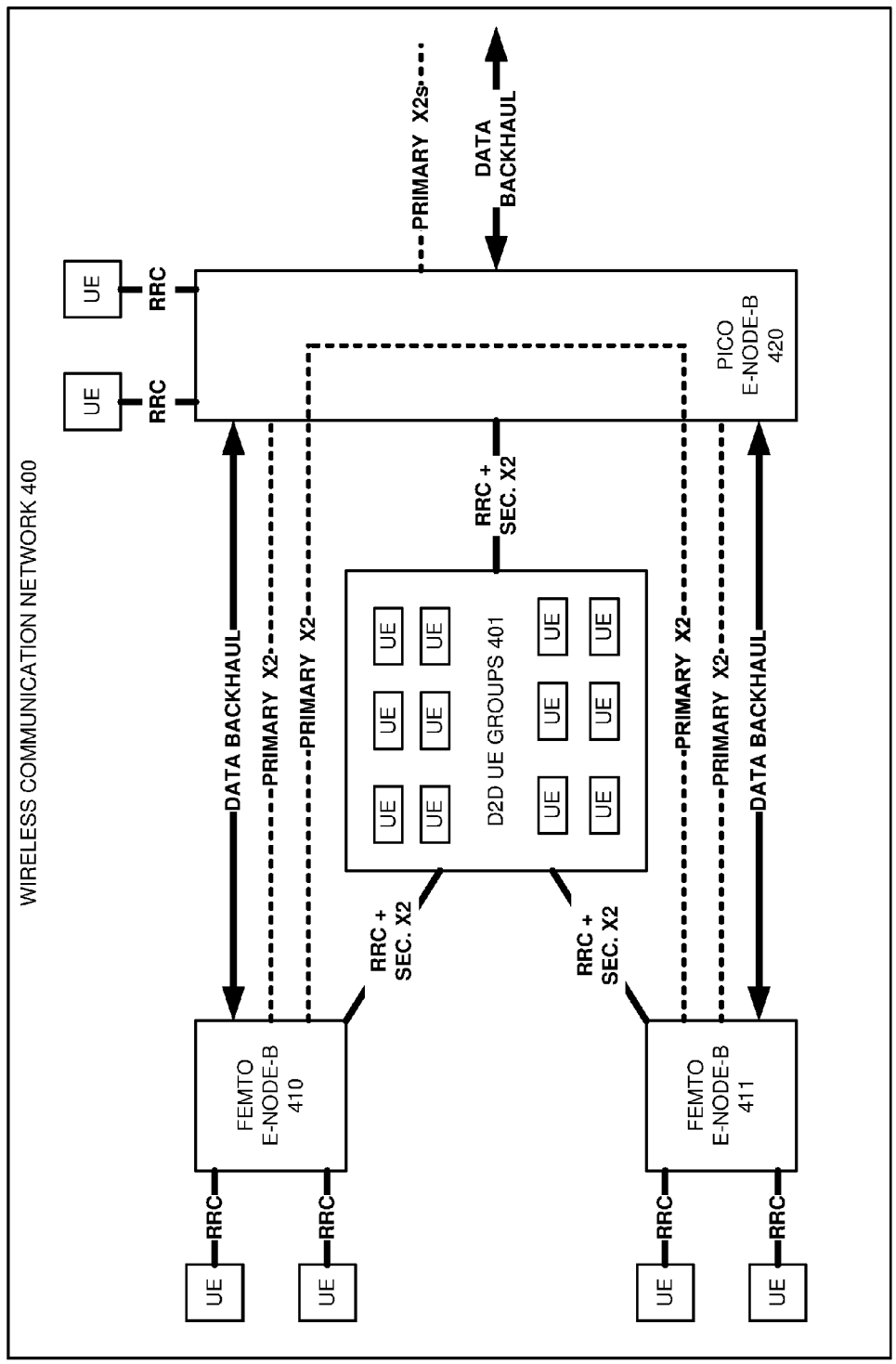
FIG. 4 illustrates a wireless communication network with femtocell and picocell eNodeBs to implement secondary X2 signaling links over D2D User Equipment (UE) groups.

FIG. 4 illustrate wireless communication network 400 having femtocell eNodeBs 410-411 and picocell eNodeBs 420 to implement secondary X2 signaling links over Device-to-Device (D2D) communications. Wireless communication network 400 comprises various UEs, femtocell eNodeBs 410-411, and picocell eNodeB 420. Many UEs are in one of multiple D2D UE groups 401.

Picocell eNodeB 420 has user data backhaul links to the network core through a macrocell eNodeB, but for clarity, the macrocell eNodeB and the network core are not shown. Femtocell eNodeBs 410-411 also have user data backhaul links to the network core through picocell eNodeB 420 and the macrocell eNodeB. Femtocell eNodeBs 410-411 and their attached UEs communicate wirelessly over Long Term Evolution (LTE) Radio Resource Control (RRC) links. Likewise, picocell eNodeB 420 and its UEs communicate wirelessly over LTE RRC links. The UEs use RRC signaling to attach, request services, and exchange data with eNodeBs 411-411 and 420. Femtocell eNodeBs 411-411 and picocell eNodeB 420 use the data backhaul links to serve the UEs with wireless communication services.

The UEs in D2D groups 401 are also configured to implement D2D communications under control of eNodeBs 410-411 and 420. eNodeBs 410-411 and 420 schedule direct wireless transfers between UEs in the same D2D UE group. In a D2D group, the transmitting UE and the receiving UEs use the same LTE resource blocks for wireless communications with eNodeB control but without eNodeB data traversal.

Femtocell eNodeB 410 and picocell eNodeB 420 exchange network signaling over a primary X2 signaling link. Femtocell eNodeB 411 and picocell eNodeB 420 also exchange network signaling over a primary X2 signaling link. Femtocell eNodeB 410 and femtocell eNodeB 411 exchange network signaling over a primary X2 signaling link that traverses picocell eNodeB 420. Picocell eNodeB 420 has other primary X2 signaling links to other eNodeBs which are not shown for clarity. The network X2 signaling comprise interference information, handover information, coordinated multi-point data, D2D information, and the like.

When the primary X2 signaling link between femtocell eNodeB 410 and picocell eNodeB 420 is lost, picocell eNodeB 420 selects one of D2D UE groups 401 to implement a secondary X2 signaling link. Picocell eNodeB 421 performs the D2D UE group selection because it has more D2D UE groups than femtocell eNodeB 410. Picocell eNodeB 420 selects the D2D UE group having the closest UE to femtocell eNodeB 410. Picocell eNodeB 420 then selects a primary UE in selected D2D UE group that is closest to picocell eNodeB 420. Picocell eNodeB 420 also selects a secondary UE in selected D2D UE group that is closest to femtocell eNodeB 410.

Picocell eNodeB 420 configures the primary UE in the selected D2D UE group to exchange X2 signaling over its RRC link with picocell eNodeB 420. Picocell eNodeB 420 configures the primary UE in the selected D2D UE group to exchange the X2 signaling over a D2D link with the secondary UE. Picocell eNodeB 420 configures the secondary UE in the selected D2D UE group to exchange the X2 signaling over the D2D link with the primary UE. Picocell eNodeB 420 also configures the secondary UE in the selected D2D UE group to initiate an RRC connection with femtocell eNodeB 410 for the secondary X2 signaling link. Femtocell eNodeB 410 is awaiting an RRC contact from a secondary UE for the secondary X2 signaling link after detecting loss of the primary X2 link but determining that picocell eNodeB 420 would initiate the secondary X2 signaling link.

Picocell eNodeB 420 and femtocell eNodeB 410 then exchange X2 signaling over the secondary X2 signaling link that traverses selected D2D UE group. Picocell eNodeB 420 and the primary UE exchange the X2 signaling over RRC. Femtocell eNodeB 410 and the secondary UE exchange the X2 signaling over RRC. The primary UE and the secondary UE in the selected D2D UE group exchange the X2 signaling over their D2D link.

When the primary X2 signaling link between femtocell eNodeB 411 and picocell eNodeB 420 is lost, picocell eNodeB 420 selects one of D2D UE groups 401 to implement a secondary X2 signaling link. Picocell eNodeB 420 performs the D2D UE group selection because it has more D2D UE groups than femtocell eNodeB 411. Picocell eNodeB 420 selects the D2D UE group having the closest UE to femtocell eNodeB 411. Picocell eNodeB 420 then selects a primary UE in selected D2D UE group that is closest to picocell eNodeB 420. Picocell eNodeB 420 also selects a secondary UE in selected D2D UE group that is closest to femtocell eNodeB 411.

Picocell eNodeB 420 configures the primary UE in the selected D2D UE group to exchange X2 signaling over its RRC link with picocell eNodeB 420. Picocell eNodeB 420 configures the primary UE in the selected D2D UE group to exchange the X2 signaling over a D2D link with the secondary UE. Picocell eNodeB 420 configures the secondary UE in the selected D2D UE group to exchange the X2 signaling over the D2D link with the primary UE. Picocell eNodeB 420 also configures the secondary UE in the selected D2D UE group to initiate an RRC connection with femtocell eNodeB 411 for the secondary X2 signaling link. Femtocell eNodeB 411 is awaiting an RRC contact from a secondary UE for the secondary X2 signaling link after detecting loss of the primary X2 link but determining that picocell eNodeB 420 would initiate the secondary X2 signaling link.

Picocell eNodeB 420 and femtocell eNodeB 411 then exchange X2 signaling over the secondary X2 signaling link that traverses selected D2D UE group. Picocell eNodeB 420 and the primary UE exchange the X2 signaling over RRC. Femtocell eNodeB 411 and the secondary UE exchange the X2 signaling over RRC. The primary UE and the secondary UE in the selected D2D UE group exchange the X2 signaling over their D2D link.

When the primary X2 signaling link between femtocell eNodeB 410 and femtocell eNodeB 411 is lost, femtocell eNodeB 411 selects one of D2D UE groups 401 to implement a secondary X2 signaling link. Femtocell eNodeB 411 performs the D2D UE group selection because it has more D2D UE groups than femtocell eNodeB 410. Femtocell eNodeB 411 selects the D2D UE group having the closest UE to femtocell eNodeB 410. Femtocell eNodeB 411 then selects a primary UE in selected D2D UE group that is closest to femtocell eNodeB 411. Femtocell eNodeB 411 also selects a secondary UE in selected D2D UE group that is closest to femtocell eNodeB 410.

Femtocell eNodeB 411 configures the primary UE in the selected D2D UE group to exchange X2 signaling over its RRC link with femtocell eNodeB 411. Femtocell eNodeB 411 configures the primary UE in the selected D2D UE group to exchange the X2 signaling over a D2D link with the secondary UE. Femtocell eNodeB 411 configures the secondary UE in the selected D2D UE group to exchange the X2 signaling over the D2D link with the primary UE. Femtocell eNodeB 411 also configures the secondary UE in the selected D2D UE group to initiate an RRC connection with femtocell eNodeB 410 for the secondary X2 signaling link. Femtocell eNodeB 410 is awaiting an RRC contact from a secondary UE for the secondary X2 signaling link after detecting loss of the primary X2 link but determining that femtocell eNodeB 411 would initiate the secondary X2 signaling link.

Femtocell eNodeB 410 and femtocell eNodeB 411 then exchange X2 signaling over the secondary X2 signaling link that traverses selected D2D UE group. Femtocell eNodeB 411 and the primary UE exchange the X2 signaling over RRC. Femtocell eNodeB 410 and the secondary UE exchange the X2 signaling over RRC. The primary UE and the secondary UE in the selected D2D UE group exchange the X2 signaling over their D2D link.

Figure 5:
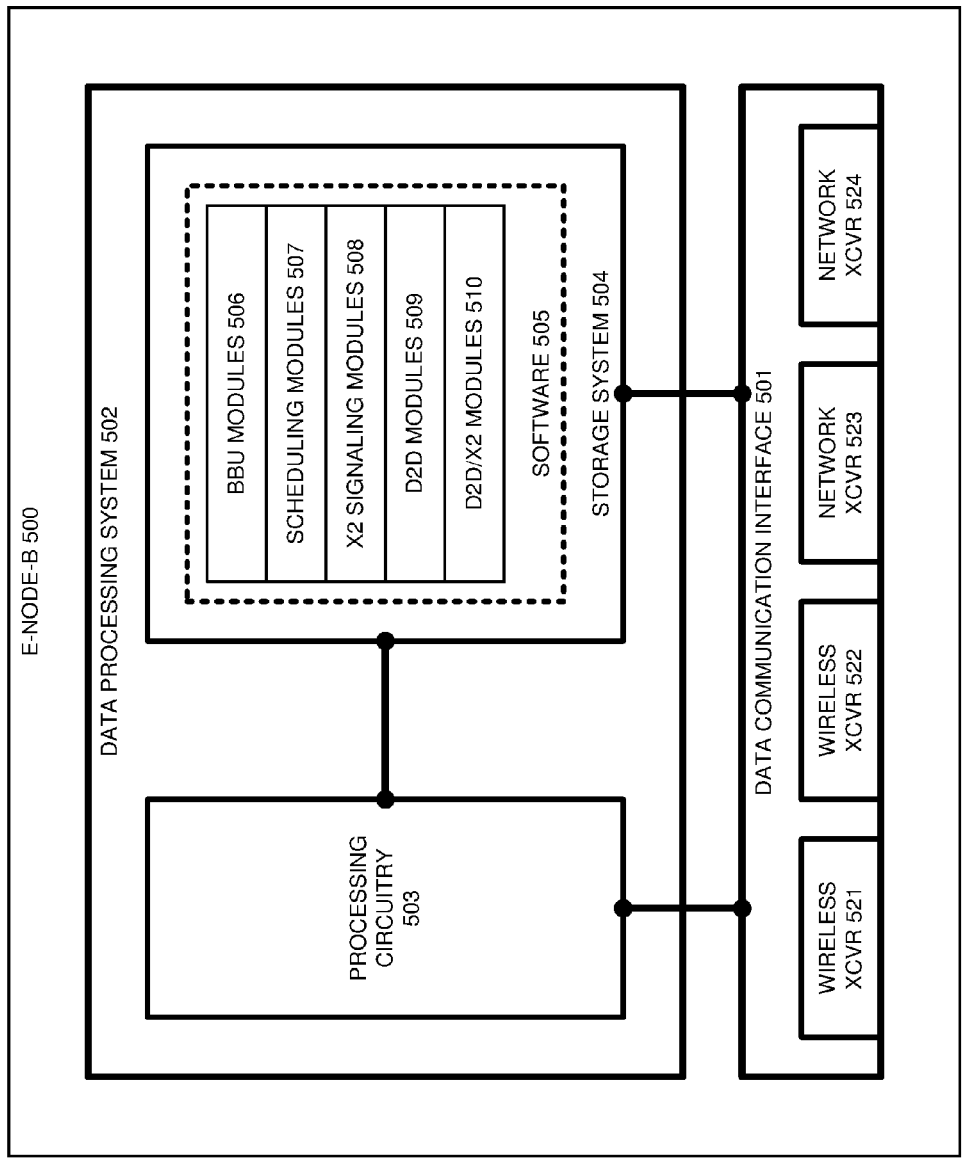
FIG. 5 illustrates an eNodeB to implement secondary X2 signaling links over D2D UE groups.

FIG. 5 illustrates eNodeB 500 to implement secondary X2 signaling links over Device-to-Device (D2D) communication groups. eNodeB 500 is an example of eNodeBs 110, 120, 410-411, and 420, although these eNodeBs may use alternative configurations and operations. eNodeB 500 comprises data communication interface 501 and data processing system 502. Data communication interface 501 comprises wireless transceivers 521-522 and network transceivers 523-524. Data processing system 502 comprises processing circuitry 503 and storage system 504. Storage system 504 stores software 505. Software 505 includes respective software modules 506-510.

Wireless transceivers 521-522 comprise wireless communication components, such as antennas, amplifiers, filters, modulators, digital signal processors, bus interfaces, memory, software, and the like. Network transceivers 523-524 may comprise wireless and/or wireline communication components, such as ports, bus interfaces, digital signal processors, antennas, amplifiers, filters, modulators, memory, software, and the like. Processing circuitry 503 comprises server blades, circuit boards, bus interfaces, integrated circuitry, and associated electronics. Storage system 504 comprises non-transitory, machine-readable, data storage media, such as flash drives, disc drives, memory circuitry, data servers, and the like. Software 505 comprises machine-readable instructions that control the operation of processing circuitry 503 when executed. eNodeB 500 may be centralized or distributed. All or portions of software 506-510 may be externally stored on one or more storage media, such as circuitry, discs, and the like. Some conventional aspects of eNodeB 500 are omitted for clarity, such as power supplies, enclosures, and the like.

When executed by processing circuitry 503, software modules 506-510 direct circuitry 503 to perform the following operations. Broadband Unit (BBU) modules 506 control wireless transceivers 521-522 to perform RRC attachment and data exchanges for UEs. Scheduling modules 507 assign wireless communication resource blocks to UEs based on quality-of-service, user priority, and the like. X2 signaling modules exchange X2 signaling with other eNodeBs for interference management, coordinated multipoint, handovers, and other network tasks. D2D modules 509 identify D2D groups, select master/primary UEs, and direct scheduling modules 507 to schedule D2D UEs to share the same transmit/receive resource blocks. D2D/X2 modules 510 detect the loss of the primary X2 and direct D2D modules 509 to select an X2 D2D group and install the secondary X2 link over D2D links. D2D/X2 modules 510 also direct BBU modules 506 to install the secondary X2 link over RRC links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network to implement a secondary X2 signaling link between evolved Node Bs (eNodeBs), the method comprising:
    the eNodeBs exchanging network signaling over a primary X2 signaling link and serving a plurality of wireless communication device groups with a Device-to-Device (D2D) wireless communication service;
    the eNodeBs detecting a performance loss of the primary X2 signaling link and responsively selecting one of the wireless communication device groups to implement the secondary X2 signaling link; and
    the eNodeBs establishing the secondary X2 signaling link through the selected wireless communication device group and exchanging additional network signaling over the secondary X2 signaling link through the selected wireless communication device group wherein the selected wireless communication device group uses the D2D wireless communication service to exchange the additional network signaling.

2. The method of claim 1 wherein selecting the selected wireless communication device group comprises selecting one of the wireless communication device groups that is co-located in coverage areas of both of the eNodeBs.

3. The method of claim 2 wherein establishing the secondary X2 signaling link through the selected wireless communication device group comprises selecting a primary device in the selected wireless communication device group to implement the secondary X2 signaling link.

4. The method of claim 3 wherein establishing the secondary X2 signaling link through the selected wireless communication device group comprises selecting a secondary device in the selected wireless communication device group to implement the secondary X2 signaling link.

5. The method of claim 4 wherein establishing the secondary X2 signaling link through the selected wireless communication device group comprises directing the primary device in the selected wireless communication device group to implement the secondary X2 signaling link using the D2D wireless communication service.

6. The method of claim 5 wherein directing the primary device in the selected wireless communication device group implement the secondary X2 signaling link comprises directing the primary device to communicate with a secondary device in the selected wireless communication device group to implement the secondary X2 signaling link using the D2D wireless communication service.

7. The method of claim 6 wherein exchanging the additional network signaling over the secondary X2 signaling link comprises exchanging the additional network signaling with the primary device and with the secondary device in the selected wireless communication device group wherein the primary device and the secondary device use the D2D wireless communication service to exchange the additional network signaling.

8. The method of claim 6 wherein selecting the one of the wireless communication device groups to provide the secondary X2 signaling link comprises one of the eNodeBs that serves more of the wireless communication device groups than the other one of the eNodeBs performing the selection of the selected wireless communication device group to implement the secondary X2 signaling link using the D2D wireless communication service.

9. The method of claim 6 wherein at least one of the eNodeBs comprises a femtocell base station.

10. The method of claim 6 wherein at least one of the eNodeBs comprises a picocell base station.

11. A wireless communication network to implement a secondary X2 signaling link, the wireless communication network comprising:
    a source eNodeB configured to exchange network signaling over a primary X2 signaling link, serve a plurality of wireless communication device groups with a Device-to-Device (D2D) wireless communication service, detect a performance loss of the primary X2 signaling link and responsively select one of the wireless communication device groups to implement the secondary X2 signaling link, establish the secondary X2 signaling link through the selected wireless communication device group, and exchange additional network signaling over the secondary X2 signaling link through the selected wireless communication device group; and
    a target eNodeB configured to exchange the network signaling over the primary X2 signaling link, serve the plurality of wireless communication device groups with the D2D wireless communication service, detect the performance loss of the primary X2 signaling link and responsively establish the secondary X2 signaling link through the selected wireless communication device group, and exchange additional network signaling over the secondary X2 signaling link through the selected wireless communication device group; and wherein
    the selected wireless communication device group uses the D2D wireless communication service to exchange the additional network signaling.

12. The wireless communication network of claim 11 wherein the source eNodeB is configured to select one of the wireless communication device groups that is co-located in coverage areas of both of the eNodeBs.

13. The wireless communication network of claim 12 wherein the source eNodeB is configured to select a primary device in the selected wireless communication device group to implement the secondary X2 signaling link.

14. The wireless communication network of claim 13 wherein the source eNodeB is configured to select a secondary device in the selected wireless communication device group to implement the secondary X2 signaling link.

15. The wireless communication network of claim 14 wherein the source eNodeB is configured to direct the primary device in the selected wireless communication device group to implement the secondary X2 signaling link using the D2D wireless communication service.

16. The wireless communication network of claim 15 wherein the source eNodeB is configured to direct the primary device to communicate with a secondary device in the selected wireless communication device group to implement the secondary X2 signaling link using the D2D wireless communication service.

17. The wireless communication network of claim 16 wherein the source eNodeB is configured to exchange the additional network signaling with the primary device in the selected wireless communication device group, the target eNodeB is configured to exchange the additional network signaling with the secondary device in the selected wireless communication device group, and wherein the primary device and the secondary device use the D2D wireless communication service to exchange the additional network signaling.

18. The wireless communication network of claim 16 wherein the source eNodeB and the target eNodeB are each configured to determine that the source eNodeB serves more of the wireless communication device groups than the target eNodeB.

19. The wireless communication network of claim 16 wherein at least one of the source eNodeB and the target eNodeB comprise a femtocell base station.

20. The wireless communication network of claim 16 wherein at least one of the source eNodeB and the target eNodeB comprise a picocell base station.

* * * * *